US012668693B2

(12) United States Patent
Wang et al.

(10) Patent No.: US 12,668,693 B2
(45) Date of Patent: Jun. 30, 2026

(54) POLYPROPYLENE BASED FILM

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuess, Linz (AT); Stefan Ortner, Linz (AT)

(73) Assignee: Borealis AG, Vienna (AT)

( * ) Notice: Subject to any disclaimer, the term of this patent is extended or adjusted under 35 U.S.C. 154(b) by 644 days.

(21) Appl. No.: 18/020,680

(22) PCT Filed: Aug. 25, 2021

(86) PCT No.: PCT/EP2021/073521

§ 371 (c)(1),
(2) Date: Feb. 10, 2023

(87) PCT Pub. No.: WO2022/043385

PCT Pub. Date: Mar. 3, 2022

(65) Prior Publication Data

US 2023/0257567 A1 Aug. 17, 2023

(30) Foreign Application Priority Data

Aug. 27, 2020 (EP) .................................... 20193028

(51) Int. Cl.
*C08L 23/14* (2006.01)

(52) U.S. Cl.
CPC .................................... *C08L 23/14* (2013.01)

(58) Field of Classification Search
CPC ....................................................... C08L 23/14
See application file for complete search history.

(56) References Cited

U.S. PATENT DOCUMENTS

| | | | | |
|---|---|---|---|---|
| 6,251,995 | B1 * | 6/2001 | Hesse | C08J 5/18 525/240 |
| 7,473,463 | B2 * | 1/2009 | Wolfschwenger | B32B 7/12 428/484.1 |
| 2006/0178483 | A1 | 8/2006 | Mehta et al. | |
| 2011/0065873 | A1 * | 3/2011 | Grein | C08F 10/06 526/90 |
| 2016/0122449 | A1 * | 5/2016 | Wang | C08L 23/142 526/123.1 |
| 2016/0257809 | A1 | 9/2016 | Biondini et al. | |
| 2018/0030255 | A1 * | 2/2018 | Tranninger | C08L 23/14 |
| 2018/0155538 | A1 | 6/2018 | Cheng et al. | |
| 2018/0244905 | A1 * | 8/2018 | Wang | C08L 23/16 |

FOREIGN PATENT DOCUMENTS

| | | | |
|---|---|---|---|
| EA | 16339 | B1 | 4/2012 |
| EP | 0887379 | B1 | 12/2004 |
| JP | 2003073426 | A | 12/2003 |
| RU | 2602894 | C2 | 11/2016 |
| RU | 2676711 | C1 | 1/2019 |
| RU | 2705056 | C2 | 11/2019 |
| WO | 9212182 | A1 | 7/1992 |
| WO | 9924478 | A1 | 5/1999 |
| WO | 9924479 | A1 | 5/1999 |
| WO | 0068315 | A1 | 11/2000 |
| WO | 2004000899 | A1 | 12/2003 |
| WO | 2004111095 | A1 | 12/2004 |
| WO | 2005026240 | A1 | 3/2005 |
| WO | 2012126759 | A1 | 9/2012 |
| WO | 2014154610 | A1 | 10/2014 |
| WO | 2014187686 | A1 | 11/2014 |
| WO | 2015169653 | A1 | 11/2015 |
| WO | 2016091924 | A1 | 6/2016 |
| WO | 2016139162 | A1 | 9/2016 |
| WO | 2020239602 | A1 | 3/2020 |
| WO | 2020064673 | A1 | 4/2020 |
| WO | 2020099566 | A1 | 5/2020 |

OTHER PUBLICATIONS

Chukanova O.M. Macromolecular Compounds Series A 2003 vol. 45 N8 p. 1268-1273.

Office Action with English Translation for Russian Patent Application No. 2023105495/04 dated Aug. 31, 2023, 23 pages.

Search Report with English Translation for Russian Patent No. 2023105495/04 dated Mar. 31, 2023, 4 pages.

Fratini, Christopher M., "Study of the Morphology and Optical Properties of Propylene/Ethylene Copolymer Films", Virginia Polytechnic Institute and State University, Apr. 14, 2006, 214 pages.

Fujiyama et al., "Crystallization and Melting Characteristics of Metallocene Isotactic Polypropylenes", Journal of Applied Polymer Science, vol. 85, pp. 1851-1857, Jun. 26, 2001.

International Search Report and Written Opinion for Internationaal Patent No. PCT/EP2021/073521 mailed Dec. 6, 2021, 13 pages.

European Search Report for European Patent Application No. 20193028.6 dated Feb. 11, 2021, 8 pages.

Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.

(Continued)

*Primary Examiner* — Robert C Boyle
(74) *Attorney, Agent, or Firm* — Lowenstein Sandler LLP

(57) ABSTRACT

The present invention relates to a film, preferably an unoriented film, comprising a polypropylene composition comprising a random copolymer of propylene monomer units and ethylene comonomer units, wherein the random copolymer has a content of ethylene comonomer units of from 0.5 to 4.0 wt %, based on the total weight amount of monomer units in the random copolymer, the polypropylene composition has a melt flow rate MFR2 of from 0.5 to 20.0 g/10 min, determined according to ISO 1133 at a temperature of 230° C. and a load of 2.16 kg, and the film has a tensile modulus in machine direction TM-MD in the range of from 450 to 850 MPa, when measured according to ISO 527-3 on a 50 μm monolayer cast film, a process for producing such a film and the use of such a polypropylene composition for the production of a film with an improved balance of properties of tensile modulus and protrusion impact.

7 Claims, No Drawings

(56) References Cited

OTHER PUBLICATIONS

Resconi, et al., "Selectivity in Propene Polymerization with Metallocene Catalysts," Chem. Rev., 2000, vol. 100, pp. 1253-1345.
Galli, et al., "Technology: driving force behind innovation and growth of polyleins", Progress in Plymer Science vol. 26, 2001, pp. 1287-1336.
Nello Pasquini, "Blow Molding—Extrusion Blow Molding" Polypropylene Handbook, 2nd Edition, 2005, Hanser Publishers, p. 445.
Randall, et al., "A Review of High Resolution Liquid 13Carbon Nuclear Magnet Resonance Characterizations of Ethylene-Based Polymers", Rev. Macromol. Chem. Phys. 1989, C29, 201-317.
Singh, et al., "Triad Sequence Determination of Ethylene-Propylene Copolymers—Application of Quantitative 13C NMR," Polymer Testing, 2009, vol. 29, pp. 475-479.
Wang, et al., "Structural Analysis of Ethylene/Propylene Copolymers Synthesized with a Constrained Geometry Catalyst," Macromolecules, 2000, vol. 33, pp. 1157-1162.
Zhou, et al., "A new decoupling method for accurate quantification of polyethylene copolymer composition and triad sequence distribution with 13C NMR," Journal of Magnetic Resonance, vol. 187, 2007, pp. 225-233.
Zweifel, et al., "Plastic Additives Handbook", 6th edition, Hanser Publications, 2009 pp. 1141 to 1190.
Cheng, H.N., "C NMR Analysis of Ethylene-Propylene Rubbers," Macromolecules, 1984, vol. 17, 1984, pp. 1950-1955.

* cited by examiner

POLYPROPYLENE BASED FILM

CROSS-REFERENCE TO RELATED APPLICATION(S)

The present application is a national stage entry under 35 U.S.C. § 371 of International Application No. PCT/EP2021/073521, filed on Aug. 25, 2021, which claims priority to European Patent Application No. 20193028.6, filed on Aug. 27, 2020. The contents of these applications are hereby incorporated by reference in their entirety.

FIELD OF THE INVENTION

The present application relates to a film comprising a polypropylene composition comprising a random copolymer of propylene monomer units and ethylene comonomer units with a high tensile modulus in machine direction, a process for producing said film and the use of said polypropylene composition for the production of a film with a good balance of tensile modulus and protrusion impact.

TECHNICAL BACKGROUND

Propylene copolymers are very well known and quite often used in the field of film making. In this technical area, polymers are required which combine high transparency, high mechanical strength and high impact strength. Quite often also high flowability of the used polymer is desired to reduce the process costs. However, it is demanding to fulfill all the required demands with one polymer since the improvement of one property is paid on the expense of another property.

WO 2014/187686 A1 of Borealis AG discloses a polypropylene composition comprising a propylene random copolymer for unoriented film applications with good optical and mechanical properties. The blown films of example section show good mechanical and impact properties but the optical properties leave something to be desired.

WO 2015/169653 A1 of Basell Poliolefine Italia SRL discloses random propylene ethylene copolymers for film applications with good optical properties but leaves open mechanical and impact properties.

Thus, there is a need in the art for polypropylene based films which show a good balance of properties as to good mechanical properties, good impact properties and good optical properties.

It has surprisingly been found that films showing such a good balance of properties can be prepared from polypropylene compositions comprising a random copolymer of propylene monomer units with ethylene comonomer units which has a rather low content of ethylene comonomer units of from 0.5 to 4.0 wt %, based on the total amount of monomer units in the random copolymer.

SUMMARY OF THE INVENTION

The present invention relates to a film, preferably an unoriented film, comprising a polypropylene composition comprising a random copolymer of propylene monomer units and ethylene comonomer units, wherein the random copolymer has a content of ethylene comonomer units of from 0.5 to 4.0 wt %, based on the total weight amount of monomer units in the random copolymer, the polypropylene composition has a melt flow rate $MFR_2$ of from 0.5 to 20.0 g/10 min, determined according to ISO 1133 at a temperature of 230° C. and a load of 2.16 kg, and the film has a tensile modulus in machine direction TM-MD in the range of from 450 to 850 MPa, when measured according to ISO 527-3 on a 50 μm monolayer cast film.

In a further aspect the present invention relates to a process for producing a film, preferably an unoriented film, as described above or below comprising the steps of a) Polymerizing the random copolymer of propylene monomer units and ethylene comonomer units in the presence of a single site catalyst system;

b) Preparing the polypropylene composition; and c) Preparing the film.

In another aspect, the present invention relates to the use of a polypropylene composition comprising a random copolymer of propylene monomer units and ethylene comonomer units, wherein the random copolymer has a content of ethylene comonomer units of from 0.5 to 4.0 wt %, based on the total weight amount of monomer units in the random copolymer, and the polypropylene composition has a melt flow rate $MFR_2$ of from 0.5 to 20.0 g/10 min, determined according to ISO 1133 at a temperature of 230° C. and a load of 2.16 kg, for the production of a film, preferably an unoriented film, with an improved balance of properties of tensile modulus and protrusion impact.

Definitions

A propylene random copolymer is a copolymer of propylene monomer units and comonomer units—in the present case ethylene comonomer units—in which the comonomer units are distributed randomly over the polypropylene chain. Thereby, a propylene random copolymer includes a fraction, which is insoluble in xylene—xylene cold insoluble (XCI) fraction—in an amount of at least 70 wt %, more preferably of at least 80 wt %, still more preferably of at least 85 wt %, most preferably of at least 88 wt %, based on the total amount of propylene random copolymer. Accordingly, the propylene random copolymer does not contain an elastomeric polymer phase dispersed therein.

A propylene homopolymer is a polymer, which essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units.

Vis-breaking is a post reactor chemical process for modifying semi-crystalline polymers such as propylene polymers. During the vis-breaking process, the propylene polymer backbone is degraded by means of peroxides, such as organic peroxides, via beta scission. The degradation is generally used for increasing the melt flow rate and narrowing the molecular weight distribution.

In the following, amounts are given as % by weight (wt %) unless it is stated otherwise.

DETAILED DESCRIPTION OF THE INVENTION

The present invention relates to a film comprising a polypropylene composition comprising a random copolymer of propylene monomer units and ethylene comonomer units, wherein the random copolymer has a content of ethylene comonomer units of from 0.5 to 4.0 wt %, based on the total weight amount of monomer units in the random copolymer, the polypropylene composition has a melt flow rate $MFR_2$ of from 0.5 to 20.0 g/10 min, determined according to ISO 1133 at a temperature of 230° C. and a load of 2.16 kg, and the film has a tensile modulus in machine direction TM-MD in the range of from 450 to 850 MPa, when measured according to ISO 527-3 on a 50 μm monolayer cast film.

The film of the present invention preferably is an unoriented film.

Random Copolymer

The random copolymer is a random copolymer with a molar majority of propylene monomer units and a molar minority of ethylene comonomer units.

The random copolymer in one embodiment can comprise further comonomer units selected from alpha-olefins having from 4 to 12 carbon atoms. It is, however, preferred that the random copolymer consists of propylene monomer units and ethylene comonomer units.

The random copolymer has a content of ethylene comonomer units of from 0.5 to 4.0 wt %, preferably from 0.7 to 3.5 wt %, more preferably from 1.0 to 3.0 wt % and most preferably from 1.3 to 2.8 wt %, based on the total weight amount of monomer units in the random copolymer.

Further, the random copolymer preferably has a melt flow rate $MFR_2$ of from 0.5 to 20.0 g/10 min, more preferably from 1.0 to 15.0 g/10 min and most preferably from 1.5 to 12.5 g/10 min, determined according to ISO 1133 at a temperature of 230° C. and a load of 2.16 kg.

The random copolymer preferably has a xylene cold solubles (XCS) content of from 0.05 to 5.00 wt %, more preferably from 0.10 to 3.50 wt % and most preferably from 0.20 to 2.50 wt %, based on the total weight content of the random copolymer.

Still further, the random copolymer preferably has a melting temperature Tm of from 122° C. to 150° C., more preferably from 123° C. to 148° C., still more preferably from 125° C. to 144° C.

Preferably, the random copolymer has been produced in the presence of a single site catalyst system, preferably comprising a metallocene catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes. These regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000,100 (4), pages 1316-1327. By introducing defects into the polymer chain, such as comonomers, stereo-errors or regio-defects, the physical properties of polypropylene can be modified. In particular, by increasing the amount of chain defects, crystallinity and melting point of polypropylene can be reduced.

The term "2,1 regio defects" as used in the present invention defines the sum of 2,1 erythro regio-defects and 2,1 threo regio-defects.

Accordingly it is preferred that the propylene copolymer (R-PP) according to this invention has a sum of 2,1- and 3,1-regio-defects of at least 0.10 mol %, such as from 0.10 to 1.40 mol %, more preferably in the range of 0.20 to 1.20 mol %, still more preferably in the range of from 0.30 to 1.10 mol % and most preferably from 0.35 to 1.00 mol %, determined by $^{13}$C-NMR spectroscopy.

The random copolymer is preferably produced in a sequential polymerization process in the presence of a single site catalyst system as defined below.

The term "sequential polymerization process" indicates that the random copolymer is produced in at least two reactors, preferably in two reactors, connected in series. Accordingly, the present process comprises at least a first reactor (R1) and a second reactor (R2). The term "polymerization reactor" shall indicate that the main polymerization takes place there. Thus in case the process consists of two polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60 wt % monomer. According to the present invention the slurry reactor (SR) is preferably a (bulk) loop reactor (LR).

The second reactor (R2) is preferably a gas phase reactor (GPR). Such gas phase reactor (GPR) can be any mechanically mixed or fluid bed reactor. For example the gas phase reactor (GPR) can be a mechanically agitated fluid bed reactor with gas velocities of at least 0.2 m/sec. Thus, it is appreciated that the gas phase reactor is a fluidized bed type reactor, optionally with a mechanical stirrer.

Thus in a preferred embodiment the first reactor (R1) is a slurry reactor (SR), like a loop reactor (LR), whereas the second reactor (R2) is a gas phase reactor (GPR). Accordingly for the instant process two polymerization reactors, namely a slurry reactor (SR), like a loop reactor (LR), and a gas phase reactor (GPR) are connected in series. If needed prior to the slurry reactor (SR) a pre-polymerization reactor is placed.

Preferably, in the first reactor (R1) the first random copolymer fraction of the random copolymer is produced, whereas in the second rector (R2) the second random copolymer fraction is produced.

In one embodiment, the two random copolymer fractions can differ in their ethylene comonomer content or their molecular weight or both. In this embodiment, the random copolymer is a multimodal, preferably a bimodal, random copolymer.

In another embodiment, the random copolymer fractions do not differ significantly in their ethylene comonomer content and their molecular weight. In this embodiment, the random copolymer is a unimodal random copolymer.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell described e.g. in FIG. 20 of the paper by Galli and Vecello, Prog. Polym. Sci. 26 (2001) 1287-1336.

Preferably, in the instant process for producing the random copolymer as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., like 68 to 95° C., the pressure is within the range of 20 bar to 80 bar, preferably between 40 bar to 70 bar, hydrogen can be added for controlling the molar mass in a manner known per se.

The ethylene to propylene ($C_2/C_3$) feed ratio is preferably in the range of from 10 to 50 mol/kmol. The hydrogen to propylene ($H_2/C_3$) feed ratio is adapted to achieve the desired molecular weight resp. melt flow rate.

Subsequently, the reaction mixture from step (a) (containing preferably the first random copolymer fraction) is transferred to the second reactor (R2), i.e. gas phase reactor (GPR), whereby the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The ethylene to propylene ($C_2/C_3$) feed ratio is preferably in the range of from 50 to 120 mol/kmol. The hydrogen to propylene ($H_2/C_3$) feed ratio is adapted to achieve the desired molecular weight resp. melt flow rate.

The residence time can vary in the two reaction zones.

In one embodiment of the process for producing the random copolymer the residence time the first reactor (R1), i.e. the slurry reactor (SR), like a loop reactor (LR), is in the range 0.2 to 4.0 hours, like 0.3 to 1.5 hours and the residence time in the gas phase reactor (GPR) will generally be 0.4 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactor (GPR).

The prepolymerization reaction is typically conducted at a temperature of 0 to 50° C., preferably from 10 to 45° C., and more preferably from 15 to 40° C. The prepolymerization time is typically 0.1 to 1.0 hours, like 0.2 to 0.8 hours.

The random copolymer is preferably polymerized in the presence of a single-site catalyst system, more preferably of a metallocene catalyst complex and cocatalysts.

Preferred complexes of the metallocene catalyst include:

rac-dimethylsilanediylbis[2-methyl-4-(3',5'-dimethylphenyl)-5-methoxy-6-tert-butylinden-1-yl]zirconium dichloride, rac-anti-dimethylsilanediyl[2-methyl-4-(4'-tert-butylphenyl)-inden-1-yl][2-methyl-4-(4'-tertbutylphenyl)-5-methoxy-6-tert-butylinden-1-yl] zirconium dichloride, rac-anti-dimethylsilanediyl[2-methyl-4-(4'-tert-butylphenyl)-inden-1-yl][2-methyl-4-phenyl-5-methoxy-6-tert-butylinden-1-yl] zirconium dichloride, rac-anti-dimethylsilanediyl[2-methyl-4-(3',5'-tert-butylphenyl)-1,5,6,7-tetrahydro-sindacen-1-yl][2-methyl-4-(3',5'-dimethyl-phenyl)-5-methoxy-6-tert-butylinden-1-yl] zirconium dichloride, rac-anti-dimethylsilanediyl[2-methyl-4,8-bis-(4'-tert-butylphenyl)-1,5,6,7-tetrahydro-sindacen-1-yl][2-methyl-4-(3',5'-dimethyl-phenyl)-5-methoxy-6-tert-butylinden-1-yl] zirconium dichloride, rac-anti-dimethylsilanediyl[2-methyl-4,8-bis-(3',5'-dimethylphenyl)-1,5,6,7-tetrahydro-s-indacen-1-yl][2-methyl-4-(3',5'-dimethylphenyl)-5-methoxy-6-tert-butylinden-1-yl] zirconium dichloride, rac-anti-dimethylsilanediyl[2-methyl-4,8-bis-(3',5'-dimethylphenyl)-1,5,6,7-tetrahydro-s-indacen-1-yl][2-methyl-4-(3',5'-5 ditert-butyl-phenyl)-5-methoxy-6-tert-butylinden-1-yl] zirconium dichloride.

Especially preferred is rac-anti-dimethylsilanediyl[2-methyl-4,8-bis-(3',5'-dimethylphenyl)-1,5,6,7-tetrahydro-s indacen-1-yl] [2-methyl-4-(3',5'-dimethylphenyl)-5-methoxy-6-tert10butylinden-1-yl] zirconium dichloride.

To form an active catalytic species it is normally necessary to employ a cocatalyst as is well known in the art.

It is preferred that a cocatalyst system comprising a boron containing cocatalyst and an aluminoxane cocatalyst is used in combination with the above defined metallocene catalyst complex.

The aluminoxane cocatalyst can be one of formula (I):

(I)

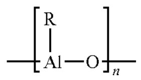

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, C1-C10-alkyl, preferably C1-C5-alkyl, or C3-C10-cycloalkyl, C7-C12-arylalkyl or -alkylaryl and/or phenyl or naphthyl, and where Y can be hydrogen, halogen, preferably chlorine or bromine, or C1-C10-alkoxy, preferably methoxy or ethoxy. The resulting oxygen-containing aluminoxanes are not in general pure compounds but mixtures of oligomers of the formula (I).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

Also a boron containing cocatalyst can be used in combination with the aluminoxane cocatalyst.

The catalyst complex ideally comprises a co-catalyst, certain boron containing cocatalysts are preferred. Especially preferred borates of use in the invention therefore comprise the trityl, i.e. triphenylcarbenium, ion. Thus the use of $Ph_3CB(PhF_5)_4$ and analogues therefore are especially favoured.

The catalyst system of the invention is used in supported form. The particulate support material used is silica or a mixed oxide such as silica-alumina, in particular silica. The use of a silica support is preferred. The skilled practitioner is aware of the procedures required to support a metallocene catalyst.

In a preferred embodiment, the catalyst system corresponds to the ICS3 of PCT/EP2020/064194.

Polypropylene Composition

The polypropylene composition comprises the random copolymer as described above or below.

Preferably, the random copolymer is present in the polypropylene composition in an amount of at least 90.00 wt %, such as from 90.00 wt % to 100 wt %, more preferably from 92.50 wt % to 99.99 wt % and most preferably from 95.0 wt % to 99.90 wt %.

The polypropylene composition can comprise further polymer(s) in addition to the random copolymer, such as propylene based polymers, like propylene homopolymers or propylene random copolymers. If present, the amount of further polymer(s) is preferably less than 10.0 wt %, preferably not more than 5.0 wt %.

It is, however, preferred that the random copolymer is the only polymer in the polypropylene composition.

The polypropylene composition usually comprises additives suitable for film applications. Suitable additives are e.g. antioxidants, slip agents and antiblocking agents. Preferably, the additive content is from 0.01 to 5.00 wt %, more preferably from 0.10 to 1.00 wt %, based on the total weight content of the polypropylene composition.

In one specific embodiment the polypropylene composition can comprise an alpha-nucleating agent.

The alpha-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and (iii) salts of diesters of phosphoric acid, e.g. sodium 2,2'-methylenebis (4,6-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Preferably, the polypropylene composition contains from 0.00001 to 5.00 wt %, more preferably from 0.0001 to 2.50 wt % of the alpha-nucleating agent.

The amount of pure alpha-nucleating agent in the polypropylene composition (without optional carrier polymer of a master batch) is preferably in the range of from 0.01 to 2000 ppm, more preferably from 0.1 to 1000 ppm.

The alpha-nucleating agent is preferably selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, vinylcycloalkane polymer, vinylalkane polymer, and mixtures thereof.

Especially preferred are vinylcycloalkane polymers such as e.g. vinylcyclohexane (VCH) polymers. Such polymers can be added e.g. using Borealis Nucleation Technology (BNT).

The additives and the alpha-nucleating agent can be added to the polypropylene composition as an isolated raw material or in a mixture with a carrier polymer, i.e. in a so-called master batch. The amount of the carrier polymer of the master batch thereby is calculated to the amount of the additives or the alpha-nucleating agent.

The additives and alpha-nucleating agents are generally commercially available and are described, for example, in “Plastic Additives Handbook”, 6th edition, 2009 of Hans Zweifel (p. 967-983).

The polypropylene composition has a melt flow rate of 0.5 to 20.0 g/10 min, more preferably from 1.0 to 15.0 g/10 min and most preferably from 1.5 to 12.5 g/10 min, determined according to ISO 1133 at a temperature of 230° C. and a load of 2.16 kg.

The melt flow rate of the polypropylene composition mainly depends on the melt flow rate of the random copolymer. In some embodiments the random copolymer has a rather low melt flow rate of less than 5.0 g/10 min or even less than 3.5 g/10 min. In these embodiments the melt flow rate of the polypropylene composition can be increased by vis-breaking in the presence of a peroxide, such as an organic peroxide, preferably during the compounding step in which the optional additives and alpha-nucleating agent are added to the polypropylene composition.

The peroxide is then usually selected depending on the compounding conditions. Suitable peroxides are commercially available and disclose optimum visbreaking conditions such as temperature, pressure, operation time and amount in their technical data sheets.

After vis-breaking, the polypropylene composition usually has a melt flow rate of from 5.5 to 20.0 g/10 min, preferably from 6.0 to 17.5 g/10 min, more preferably from 6.5 to 15.0 g/10 min and most preferably from 7.0 to 13.0 g/10 min, determined according to ISO 1133 at a temperature of 230° C. and a load of 2.16 kg.

The polypropylene composition preferably has a melting temperature Tm of from 122° C. to 150° C., more preferably from 123° C. to 148° C., still more preferably from 125° C. to 144° C.

Further, the polypropylene composition preferably has a crystallization temperature Tc of from 90° C. to less than 115° C., more preferably from 95° C. to 113° C., still more preferably from 98° C. to 110° C.

Film

The present invention is related to a film, preferably an unoriented film, comprising the polypropylene composition as described above or below.

In the following the term “film” preferably relates to an unoriented film.

The film preferably comprises at least 70 wt %, preferably comprising at least 80 wt %, more preferably comprising at least 90 wt %, still more preferably comprising at least 95 wt %, yet more preferably comprising at least 99 wt %, of the instant polypropylene composition.

It is preferred that the film consists of the instant polypropylene composition.

Preferably, the film is a cast film, a roll-stack film or a blown film, like an air cooled blown film. More preferably, the film is a cast film or a roll-stack film. Even more preferably, the film is a cast film.

One distinguishes between unoriented and oriented films (see for instance polypropylene handbook, Nello Pasquini, $2^{nd}$ edition, Hanser). Oriented films are typically biaxially oriented films, whereas unoriented films are cast or blown films, e.g. air cooled blown films, with roll-stack films being considered as a specific category of thicker cast films. Accordingly, an unoriented film is not drawn intensively in machine and transverse direction as done by oriented films. Thus, the film according to this invention is preferably not a biaxially oriented film. Preferably the film according to the instant invention is a cast film or blown film.

Preferably, the film has a thickness of 5 to 2,000 μm, preferably of 10 to 1,000 μm, more preferably of 15 to 700 μm, like of 20 to 500 μm.

The film according to the present invention surprisingly has a good balance of properties as regards mechanical properties, impact properties, optical properties and other film properties. Thereby, it has been found that by adding an alpha nucleating agent some film properties such as coefficient of friction (CoF) and hot tack force can be further improved where needed without sacrificing the other properties.

The film has a tensile modulus in machine direction TM-MD in the range of from 450 to 850 MPa, preferably in the range of from 470 to 800 MPa and most preferably in the range of from 500 to 750 MPa, when measured according to ISO 527-3 on a 50 μm monolayer cast film.

The film further preferably has a tensile modulus in transverse direction TM-TD in the range of from 450 to 850 MPa, preferably in the range of from 470 to 800 MPa and most preferably in the range of from 500 to 750 MPa, when measured according to ISO 527-3 on a 50 μm monolayer cast film.

Further, the film preferably has a protrusion impact of from 30.0 to 125.0 N, more preferably of from 32.5 to 110.0 N, most preferably from 35.0 to 100.0 N, when measured according to ASTM D5748 on a 50 μm monolayer cast film.

The film preferably has a haze of from 0 to 2.5%, more preferably from 0 to 2.4%, most preferably from 0 to 2.3%, when measured according to ASTM D 1003 on a 50 μm monolayer cast film.

Further, the film has a sealing initiation temperature SIT of from 105 to 120° C., more preferably from 107 to 118° C., most preferably from 109 to 116° C., when measured on a 50 μm monolayer cast film.

The film preferably has a coefficient of friction at 7 days CoF@7 days of from 0.01 to 0.30, more preferably from 0.02 to 0.27, most preferably 0.03 to 0.25, when measured according to DIN 53 375 on a 50 μm monolayer cast film.

Further, the film preferably has a hot tack force HTF of from 1.5 to 5.0 N, more preferably from 2.0 to 4.0 N, most preferably from 2.5 to 3.5 N, when measured according to ASTM F 1921-98 (2004), method B on a 50 μm monolayer cast film.

The coefficient of friction and hot tack force are preferably at the upper end of the ranges described above for films comprising an alpha-nucleated polypropylene composition.

Process

In a further aspect the present invention relates to a process for producing a film as described above or below comprising the steps of a) Polymerizing the random copolymer of propylene monomer units and ethylene comonomer units in the presence of a single site catalyst system;
b) Preparing the polypropylene composition; and
c) Preparing the film.

The film is preferably an unoriented film prepared by cast film or blown film extrusion.

The film, preferably being an unoriented film, the polypropylene composition and the random copolymer are preferably defined as described in any embodiments above or below.

The random copolymer is preferably polymerized as described above or below.

The polypropylene composition is preferably prepared in a compounding step optionally by adding the additives, the alpha-nucleating agent and the additional polymers as described above or below, preferably optionally the additives and the alpha-nucleating agent, during the compounding step.

In one embodiment, only additives are added.

In another embodiment, additives and the alpha-nucleating agent are added.

In some embodiments, the polypropylene composition is subjected to a visbreaking step, preferably during the instant compounding step after polymerization, as described above or below.

The compounding can be conducted in any suitable extruder using conventional compounding conditions. Typically used are co-rotating twin-screw extruders including special mixing sections operated in the temperature range from 180 to 280° C.

The film is preferably prepared by introducing the polypropylene composition into a suitable film line.

In the case the film is produced by cast film technology the polypropylene composition is extruded through a slot extrusion die onto a chill roll to cool the polymer to a solid film. Typically, the polypropylene composition is firstly compressed and liquefied in an extruder, it being possible for any additives to be already added to the polymer or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10 to 50° C., preferably from 15 to 40° C.

In the blown film process, the polypropylene composition melt is extruded through an annular die and blown into a tubular film by forming a bubble which is collapsed between nip rollers after solidification. The blown extrusion can be preferably effected at a temperature in the range 160 to 240° C., and cooled by water or preferably by blowing gas (generally air) at a temperature of 10 to 50° C. to provide a frost line height of 0.5 to 8 times the diameter of the die. The blow up ratio should generally be in the range of from 1.5 to 4, such as from 2 to 4, preferably 2.5 to 3.5.

The resulting film preferably shows all properties as described above or below.

Use

In another aspect the present invention relates to the use of a polypropylene composition comprising a random copolymer of propylene monomer units and ethylene comonomer units, wherein the random copolymer has a content of ethylene comonomer units of from 0.5 to 4.0 wt %, based on the total weight amount of monomer units in the random copolymer, and the polypropylene composition has a melt flow rate $MFR_2$ of from 0.5 to 20.0 g/10 min, determined according to ISO 1133 at a temperature of 230° C. and a load of 2.16 kg, for the production of a film, preferably an unoriented film, with an improved balance of properties of tensile modulus and protrusion impact.

Preferably, the film, preferably the unoriented film, the polypropylene composition and the random copolymer are defined as described in any embodiments above or below.

The resulting film preferably shows all properties as described above or below.

EXAMPLES

1. Determination Methods $MFR_2$ (230° C.) is measured according to ISO 1133 (230° C., 2.16 kg load). The $MFR_2$ of the polypropylene composition is determined on the granules of the material, while the $MFR_2$ of the melt-blown web is determined on cut pieces of a compression-molded plaque prepared from the web in a heated press at a temperature of not more than 200° C., said pieces having a dimension which is comparable to the granule dimension.

The xylene soluble fraction at room temperature (xylene cold soluble XCS, wt %): The amount of the polymer soluble in xylene is determined at 25° C. according to ISO 16152; $5^{th}$ edition; 2005 Jul. 1.

Microstructure Quantification by NMR Spectroscopy

Quantitative nuclear-magnetic resonance (NMR) spectroscopy was used to quantify the comonomer and region defect content of the polymers.

Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in approximately 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent {singh09}. To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {zhou07,busico07}. A total of 6144 (6 k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present.

Characteristic signals corresponding to the incorporation of ethylene were observed {wang00, cheng84, randall89}.

The comonomer fraction was quantified using the method of Wang et. al. {wang00} through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to be not present. This approach reduced the overestimation of ethylene content for such systems and was achieved by reduction of the number of sites used to determine the absolute ethylene content. Through the use of this set of sites the corresponding integral equation becomes $$p_S = I_A + (0.5 * I_B)$$

$$p_T = I_D + I_F + I_D$$

$$p = (p_S + p_T)/2$$

$$e = 0.5 * (I_H + (0.5 * I_B))$$

$$fE = e/(e+p)$$

using the same notation used in the article of Wang et. al. {wang00}.

The mole percent comonomer incorporation was calculated from the mole fraction:

$$E\ [\text{mol}\ \%] = 100 * fE$$

The weight percent comonomer incorporation was calculated from the mole fraction:

$$E\ [\text{wt}\ \%] = 100 * (fE * 28.06)/((fE * 28.06) + ((1 - fE) * 42.08))$$

Characteristic signals corresponding to regio defects were observed {resconi00, wang00}. The presence of isolated 2,1-erythro regio defects was indicated by the presence of the two methyl sites at 17.7 and 17.2 ppm and confirmed by other characteristic sites. The presence of 2,1 regio defect adjacent an ethylene unit was indicated by the two inequivalent Sαβ signals at 34.9 ppm and 34.7 ppm respectively and the Tγγ at 34.1 ppm.

The amount of isolated 2,1-erythro regio defects ($P_{21e\ isolated}$) was quantified using the average integral of the two characteristic methyl sites at 17.7 ($I_{e8}$) and 17.4 ($I_{e6}$) ppm respectively:

$$P_{21e\ isolated} = (I_{e6} + I_{e8})/2$$

The amount of 2,1 regio defect adjacent to ethylene ($P_{E21}$) was quantified using the methine site at 34.1 ppm ($I_{T\gamma\gamma}$):

$$P_{E21} = I_{T\gamma\gamma}$$

The total amount of propene ($P_{total}$) was quantified based on the methyl region ($I_{CH3}$) between 23.0 and 19.9 ppm with correction undertaken for sites included in this region not related to propene insertion. The methyl group $P_{\gamma\gamma}$ resulting from 2,1 regio defect adjacent to ethylene is already present in $I_{CH3}$:

$$P_{total} = I_{CH3} + 2 * P_{21e\ isolated}$$

The isolated 2,1-erythro regio defects ($P_{21e\ isolated}$) is multiplied by 2 to take into account the two (2) propene units in the 2,1-erythro regio defects.

The mole percent of isolated 2,1-erythro regio defects was quantified with respect to all propene:

$$[21e]\ \text{mol}\ \% = 100 * P_{21e\ isolated}/P_{total}$$

The mole percent of 2,1 regio defects adjacent to ethylene was quantified with respect to all propene:

$$[E21]\ \text{mol}\ \% = 100 * P_{E21}/P_{total}$$

The total amount of 2,1 defects was quantified as following:

$$[21]\ \text{mol}\ \% = [21e] + [E21]$$

Characteristic signals corresponding to other types of regio defects (2,1-threo, 3,1 insertion) were not observed {resconi00}.

| | |
|---|---|
| zhou07 | Zhou, Z., Kuemmerle, R., Qiu, X., Redwine, D., Cong, R., Taha, A., Baugh, D. Winniford, B., J. Mag. Reson. 187 (2007) 225 |
| busico07 | Busico, V., Carbonniere, P., Cipullo, R., Pellecchia, R., Severn, J., Talarico, G., Macromol. Rapid Commun. 2007, 28, 1128 |
| resconi00 | Resconi, L., Cavallo, L., Fait, A., Piemontesi, F., Chem. Rev. 2000, 100, 1253 |
| wang00 | Wang, W-J., Zhu, S., Macromolecules 33 (2000), 1157 |
| cheng84 | Cheng, H. N., Macromolecules 17 (1984), 1950 |
| singh09 | Singh, G., Kothari, A., Gupta, V., Polymer Testing 28 5 (2009), 475 |
| randall89 | Randall, J. Macromol. Sci., Rev. Macromol. Chem. Phys. 1989, C29, 201. |

Tensile modulus in machine and transverse direction were determined according to ISO 527-3 at 23° C. on monolayer cast films with a thickness of 50 μm produced as indicated below. Testing was performed at a cross head speed of 1 mm/min.

Protrusion impact was determined according to according to ASTM D5748 on monolayer cast films with a thickness of 50 μm produced as indicated below.

Transparency, haze and clarity were determined according to ASTM D1003-00 on monolayer cast films with a thickness of 50 μm produced as indicated below.

Sealing initiation temperature (SIT); (sealing end temperature (SET), sealing range):

The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of ≥3 N is achieved. The upper limit (sealing end temperature (SET)) is reached, when the films stick to the sealing device. The sealing range is determined on a J&B Universal Sealing Machine Type 3000 with monolayer cast films with a thickness of 50 μm produced as indicated below with the following further parameters:

| | |
|---|---|
| Specimen width: | 25.4 mm |
| Seal Pressure: | 0.1 $N/mm^2$ |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. |

Specimen is sealed A to A at each sealbar temperature and seal strength (force) is determined at each step. The temperature is determined at which the seal strength reaches 3 N.

Hot Tack Force:

The hot-tack force was determined according to ASTM F1921-12—Method B on a J&B Hot-Tack Tester on monolayer cast films with a thickness of 50 μm produced as indicated below.

All film test specimens were prepared in standard atmospheres for conditioning and testing at 23° C. (±2° C.) and 50% (±10%) relative humidity.

The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature. The hot-tack measurement was performed under the following conditions.

Film Specimen width: 25.4 mm.
Seal bar length: 50 mm
Seal bar width: 5 mm
Seal bar shape: flat
Seal Pressure: 0.3 $N/mm^2$.
Seal Time: 0.5 sec.
Cool time: 99 sec.
Peel Speed: 200 mm/sec.
Start temperature: 90° C. End temperature: 140° C. Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve.

The hot tack force (HTF) is evaluated from the curve as the highest force (maximum peak value) with failure mode "peel".

Coefficient of friction (CoF) (including static CoF and dynamic CoF) as a measure of the frictional behavior of the film is determined using a method according to ISO 8295: 1995 and ASTM D1894: 2008 on monolayer cast films with a thickness of 50 μm produced as indicated below.

2. Catalysts

The single site catalyst system used for the polymerization of the random copolymers RC1, RC2, RC3 and RC4 (according to the invention) is prepared as follows:

Catalyst Synthesis

The catalyst used was Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride as disclosed in PCT/EP2020/064194 as ICS3.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressurising and depressurising with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.2% Al by weight.

Catalyst Preparation 30 wt.-% MAO in toluene (0.7 kg) was added into a steel nitrogen blanked reactor via a burette at 20° C. Toluene (5.4 kg) was then added under stirring. The catalyst as cited above (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9% Al and 0.11% Zr.

For the polymerization of the random copolymer RC5 (comparative) a phthalate-free Ziegler Natta catalyzed prepared as described in the example section of WO 2020/064673 A1 as "Reference Catalyst" is used.

3. Polymerization of the Random Copolymers RC1-RC4 and RC5

The polymerization for preparing the random copolymers of propylene with ethylene comonomer units RC1, RC2, RC3 and RC4 (all according to the invention) as well as random copolymer (comparative) were performed in a Borstar pilot plant with a 2-reactor set-up (loop—gas phase reactor (GPR 1)) preceded by a prepolymerization reactor.

RC1 to RC4 were polymerized in the presence of the single site catalyst (SSC) system as described above, whereas RC5 was polymerized in the presence of the phthalate-free Ziegler-Natta (ZN) catalyst as described above.

In Table 1 the polymerization conditions and properties for RC1, RC2, RC3 and RC4 are given.

TABLE 1

Polymerization conditions and of the random copolymers RC1 to RC5

| | RC1 | RC2 | RC3 | RC4 | RC5 |
|---|---|---|---|---|---|
| Catalyst | SSC | SSC | SSC | SSC | ZN |
| Prepolymerization: | | | | | |
| Temperature [° C.] | 20 | 20 | 20 | 20 | 20 |
| TEAL [g/t $C_3$] | — | — | — | — | 170 |
| Donor [g/t $C_3$] | — | — | — | — | 40 |
| Donor type | — | — | — | — | D |
| Residence time [h] | 0.4 | 0.4 | 0.4 | 0.4 | 0.2 |
| Loop: | | | | | |
| Temperature [° C.] | 70 | 70 | 70 | 70 | 70 |
| Pressure [bar] | 5258 | 5258 | 5258 | 5258 | 5258 |
| Feed ratio $H_2/C_3$ [mol/kmol] | 0.10 | 0.16 | 0.09 | 0.30 | 0.40 |
| Feed ratio $C_2/C_3$ [mol/kmol] | 30.1 | 15.9 | 17.3 | 30.3 | 8.5 |
| Split [wt %] | 57 | 54 | 46 | 53 | 36 |
| Residence time [h] | 0.5 | 0.5 | 0.4 | 0.5 | 0.4 |
| $C_2$ content [wt %] | 2.1 | 0.6 | 1.2 | 2.2 | 3.6 |
| $MFR_2$ [g/10 min] | 1.3 | 1.3 | 2.2 | 11.5 | 2.0 |
| GPR1: | | | | | |
| Temperature [° C.] | 80 | 80 | 80 | 80 | 80 |
| Pressure [bar] | 2500 | 2500 | 2500 | 2500 | 2500 |
| Feed $H_2/C_3$ [mol/kmol] | 1.6 | 1.0 | 1.6 | 2.9 | 7.7 |
| Feed $C_2/C_3$ [mol/kmol] | 88.1 | 65.5 | 69.0 | 86.6 | 33.8 |
| Split [wt %] | 43 | 46 | 54 | 47 | 64 |
| Residence time [h] | 2.0 | 2.0 | 2.0 | 2.0 | 1.8 |
| $C_2$ content [wt %] | 2.5 | 1.4 | 1.7 | 2.5 | 4.3 |
| Resulting base resin | | | | | |
| $C_2$ content [wt %] | 2.3 | 1.5 | 1.7 | 2.5 | 4.3 |
| 2.1 and 3.1e regio defects [mol %] | 0.62 | 0.7 | 0.48 | 0.75 | 0 |
| Tm [° C.] | 134 | 143 | 142 | 134 | 140 |
| XCS [wt %] | 0.6 | 0.6 | 0.3 | 1.5 | 7.9 |
| $MFR_2$ [g/10 min] | 1.9 | 1.8 | 2.1 | 11.0 | 1.8 |

4. Preparation of the Compositions and Films of Examples IE1-IE4 and CE1-CE2

After polymerization the melt flow rates of the random copolymers RC1-RC3 and RC5 were modified by visbreaking during a compounding step in a twin extruder. During said compounding step additives as described below were added.

Random copolymer RC1 was visbroken to a final melt flow rate $MFR_2$ of 8.0 g/10 min to obtain the polypropylene composition of inventive example IE1.

Random copolymer RC2 was visbroken to a final melt flow rate $MFR_2$ of 12.0 g/10 min to obtain the polypropylene composition of inventive example IE2.

Random copolymer RC2 was also visbroken to a final melt flow rate $MFR_2$ of 7.5 g/10 min to obtain the polypropylene composition of inventive example IE3.

Random copolymer RC3 was visbroken to a final melt flow rate $MFR_2$ of 12.0 g/10 min to obtain the polypropylene composition of inventive example IE4.

Random copolymer RC5 was visbroken to a final melt flow rate $MFR_2$ of 8.0 g/10 min to obtain the polypropylene composition of comparative example CE1.

Random copolymer RC5 was separately also visbroken to a final melt flow rate $MFR_2$ of 11.0 g/10 min to obtain the polypropylene composition of comparative example CE2.

For examples IE1, IE2, IE3 and CE1 1000 ppm Irganox B215 (a 1:2-mixture of Pentaerythrityl-tetrakis(3-(3',5'-di-tert. butyl-4-hydroxyphenyl)-propionate, CAS-no. 6683-19-8, and Tris (2,4-di-t-butylphenyl) phosphite, CAS-no. 31570-04-4, commercially available from BASF SE, Germany) and 150 ppm magnesium oxide (CAS-no. 1309-48-4) as acid scavenger were added during the compounding step.

The polypropylene compositions were extruded to monolayer cast films with a thickness of 50 μm using a cast film co-extrusion line.

The properties of the compositions and films are listed in Table 2 below.

TABLE 2

Properties of the compositions and cast films of IE1-IE3 and CE1

| | IE1 | IE2 | IE3 | CE1 |
|---|---|---|---|---|
| Random copolymer | RC1 | RC2 | RC2 | RC5 |
| Composition: | | | | |
| $MFR_2$ [g/10 min] | 8.3 | 12.0 | 7.5 | 8.0 |
| Tc [° C.] | 100 | 107 | 106 | 98 |
| Tm [° C.] | 135 | 142 | 143 | 140 |
| 50 μm monolayer cast film: | | | | |
| Tensile modulus MD [MPa] | 529 | 649 | 646 | 449 |
| Tensile modulus TD [MPa] | 530 | 649 | 651 | 454 |
| Protrusion impact [N] | 82.66 | 83.91 | 92.73 | 75.43 |
| Haze [%] | 0.42 | 0.05 | 0.05 | 0.26 |

The inventive examples IE1 to IE3 all show improved mechanical properties in tensile modulus and improved impact properties in protrusion impact at comparable optical properties in haze when compared to comparative example CE1.

For examples IE4 and CE2 2000 ppm Crodamide OR (oleamide, CAS-no. 301-02-0, commercially available from Croda Polymer Additives, UK), 2000 ppm Gasil AB 725 (silicon dioxide, CAS-no. 7631-86-9, commercially available from PQ Corporation, UK), 1000 ppm calcium stearate (CAS-no. 1592-23-0) and 2000 ppm Irganox B215 (a 1:2-mixture of Pentaerythrityl-tetrakis(3-(3',5'-di-tert. butyl-4-hydroxyphenyl)-propionate, CAS-no. 6683-19-8, and Tris (2,4-di-t-butylphenyl) phosphite, CAS-no. 31570-04-4, commercially available from BASF SE, Germany) were added during the compounding step.

The polypropylene compositions were extruded to monolayer cast films with a thickness of 50 μm using a Collin pilot-scale cast film line.

The properties of the compositions and films are listed in Table 3 below.

TABLE 3

Properties of the compositions and cast films of IE4 and CE2

| | IE4 | CE2 |
|---|---|---|
| Random copolymer | RC3 | RC5 |
| Composition: | | |
| $MFR_2$ [g/10 min] | 11.0 | 11.0 |
| Tc [° C.] | 104 | 98 |
| Tm [° C.] | 140 | 141 |

TABLE 3-continued

| Properties of the compositions and cast films of IE4 and CE2 | | |
|---|---|---|
| | IE4 | CE2 |
| 50 μm monolayer cast film: | | |
| Tensile modulus MD [MPa] | 587 | 425 |
| Tensile modulus TD [MPa] | 575 | 440 |
| Protrusion impact [N] | 60 | 46 |
| Haze [%] | 2.0 | 2.0 |
| SIT [° C.] | 115 | 117 |
| CoF after 7 days | 0.20 | 0.20 |

The inventive example IE4 also shows improved mechanical properties in tensile modulus and improved impact properties in protrusion impact at comparable optical properties in haze when compared to comparative example CE1. Additionally IE1 shows improved sealing properties in lower SIT.

5. Preparation of the Compositions and Films of Examples IE5 and IE6

After polymerization the random copolymer RC4 was compounded in a twin extruder. Due to its high $MFR_2$ visbreaking was not necessary. During said compounding step additives as described below were added.

For example IE5 600 ppm Irganox 1010 (Pentaerythrityl-tetrakis(3-(3',5'-di-tert. butyl-4-hydroxyphenyl)-propionate, CAS-no. 6683-19-8) and 600 ppm Irgafos 168 (Tris (2,4-di-t-butylphenyl) phosphite, CAS-no. 31570-04-4, both commercially available from BASF SE, Germany), 2000 ppm Crodamide OR (oleamide, CAS-no. 301-02-0, commercially available from Croda Polymer Additives), 2000 ppm Gasil AB 725 (silicon dioxide, CAS-no. 7631-86-9, commercially available from PQ Corporation, UK) and 1000 ppm calcium stearate were added during the compounding step.

For example IE6 additionally 2.0 wt % HF995MO, being a highly crystalline propylene homopolymer produced by Borealis Nucleation Technology (BNT), (commercially available from Borealis AG) as alpha-nucleation masterbatch, comprising poly(vinyl cyclohexane) and 0.7 wt % of talc were added during the compounding step to produce an alpha-nucleated polypropylene composition.

The polypropylene compositions were extruded to monolayer cast films with a thickness of 50 μm using a cast film coextrusion line.

The properties of the compositions and films are listed in Table 4 below.

TABLE 4

| Properties of the compositions and cast films of IE4 and CE2 | | |
|---|---|---|
| | IE5 | IE6 |
| Random copolymer | RC4 | RC4 |
| Nucleating agent | no | HF995MO |
| Composition: | | |
| $MFR_2$ [g/10 min] | 10.7 | 10.7 |
| Tc [° C.] | 99 | 108 |
| Tm [° C.] | 134 | 128 |
| Hm [J/g] | 83 | 90 |
| XCS [wt %] | 1.53 | 1.53 |
| 50 μm monolayer cast film: | | |
| Tensile modulus MD [MPa] | 548 | 546 |
| Tensile modulus TD [MPa] | 567 | 557 |
| Protrusion impact [N] | 38.9 | 38.7 |
| Haze [%] | 2.11 | 1.78 |

TABLE 4-continued

| Properties of the compositions and cast films of IE4 and CE2 | | |
|---|---|---|
| | IE5 | IE6 |
| SIT [° C.] | 112 | 112 |
| Hot Tack Force [N] | 2.82 | 3.19 |
| CoF after 1 day | 0.14 | 0.14 |
| CoF after 3 days | 0.10 | 0.09 |
| CoF after 7 days | 0.09 | 0.07 |
| CoF after 14 days | 0.08 | 0.07 |

When comparing the alpha-nucleated polypropylene composition IE6 and the monolayer cast film made from said composition with the unnucleated polypropylene composition IE5 and the monolayer cast film made from said composition it can be seen that alpha nucleation has no effect on the mechanical and impact properties and the SIT of the film but improves the optical properties, the hot tack force and the migration of slip is faster. In addition, the hot-tack force HTF is improved.

The invention claimed is:

1. An unoriented cast film, unoriented roll-stack film or unoriented blown film comprising a polypropylene composition comprising a random copolymer of propylene monomer units and ethylene comonomer units, wherein:

the random copolymer has a content of ethylene comonomer units of from 0.5 to 4.0 wt %, based on the total weight amount of monomer units in the random copolymer, and a sum of 2,1- and 3,1-regio defects of from 0.10 to 1.40 mol %, determined by $^{13}$C-NMR spectroscopy, the polypropylene composition has a melt flow rate $MFR_2$ of from 0.5 to 20.0 g/10 min, determined according to ISO 1133 at a temperature of 230° C. and a load of 2.16 kg, a melting temperature Tm of from 122 to 150° C., and a crystallization temperature Tc of from 90 to less than 115° C., and the unoriented film has a tensile modulus in machine direction TM-MD in the range of from 450 to 850 MPa, when measured according to ISO 527-3 on a 50 μm monolayer cast film, a tensile modulus in transverse direction TM-TD of from 450 to 850 MPa, when measured according to ISO 527-3 on a 50 μm monolayer cast film, a haze of from 0 to 2.5%, when measured according to ASTM D 1003 on a 50 μm monolayer cast film, a sealing initiation temperature SIT of from 105 to 120° C., when measured on a 50 μm monolayer cast film, a coefficient of friction at 7 days CoF@7 days of 0.01 to 0.30, when measured according to DIN 53 375 on a 50 μm monolayer cast film, a hot tack force HTF of from 1.5 to 5.0 N, when measured according to ASTM F 1921-98 (2004), method B on a 50 μm monolayer cast film, and a protrusion impact of from 30.0 to 125.0 N, when measured according to ASTM D5748 on a 50 μm monolayer cast film.

2. The film according to claim 1, wherein the polypropylene composition comprises an alpha-nucleating agent.

3. A process for producing a film according to claim 1 comprising:

a) Polymerizing the random copolymer of propylene monomer units and ethylene comonomer units in the presence of a single site catalyst system;

b) Preparing the polypropylene composition; and c) Preparing the film.

4. The process according to claim 3, wherein the film is an unoriented film and prepared by cast film or blown film extrusion.

5. The process according to claim 3, wherein the random copolymer is polymerized to have a melt flow rate $MFR_2$ of from 0.5 to 3.5 g/10 min, determined according to ISO 1133 at a temperature of 230° C. and a load of 2.16 kg and then vis-broken to a melt flow rate $MFR_2$ of from 5.5 to 20.0 g/10 min, determined according to ISO 1133 at a temperature of 230° C. and a load of 2.16 kg.

6. The process according to claim 4, wherein the single site catalyst system comprises:

(i) a metallocene catalyst selected from rac-dimethylsilanediylbis [2-methyl-4-(3',5'-dimethylphenyl)-5-methoxy-6-tert-butylinden-1-yl] zirconium dichloride, rac-anti-dimethylsilanediyl [2-methyl-4-(4'-tert-butylphenyl)-inden-1-yl] [2-methyl-4-(4'-tertbutylphenyl)-5-methoxy-6-tert-butylinden-1-yl] zirconium dichloride, rac-anti-dimethylsilanediyl [2-methyl-4-(4'-tert-butylphenyl)-inden-1-yl] [2-methyl-4-phenyl-5-methoxy-6-tert-butylinden-1-yl] zirconium dichloride, rac-anti-dimethylsilanediyl 2-methyl-4-(3',5'-tert-butylphenyl)-1,5,6,7-tetrahydro-sindacen-1-yl] [2-methyl-4-(3',5'-dimethyl-phenyl)-5-methoxy-6-tert-butylinden-1-yl] zirconium dichloride, rac-anti-dimethylsilanediyl [2-methyl-4,8-bis-(4'-tert-butylphenyl)-1,5,6,7-tetrahydro-sindacen-1-yl][2-methyl-4-(3',5'-dimethyl-phenyl)-5-methoxy-6-tert-butylinden-1-yl] zirconium dichloride, rac-anti-dimethylsilanediyl [2-methyl-4,8-bis-(3',5'-dimethylphenyl)-1,5,6,7-tetrahydro-s-indacen-1-yl] [2-methyl-4-(3',5'-dimethylphenyl)-5-methoxy-6-tert-butylinden-1-yl] zirconium dichloride, rac-anti-dimethylsilanediyl [2-methyl-4,8-bis-(3',5'-dimethylphenyl)-1,5,6,7-tetrahydro-s-indacen-1-yl] [2-methyl-4-(3',5'-5 butyl-phenyl)-5-methoxy-6-tert-butylinden-1-yl] zirconium dichloride ditertand (iii) a cocatalyst system comprising a boron containing cocatalyst and an aluminoxane cocatalyst.

7. The film according to claim 2, wherein the polypropylene composition comprises a polymeric alpha-nucleating agent.

* * * * *